United States Patent
Devlin et al.

(10) Patent No.: US 11,540,662 B2
(45) Date of Patent: Jan. 3, 2023

(54) VENT VALVE FLOW FUSE

(71) Applicant: B/E Aerospace, Inc., Winston-Salem, NC (US)

(72) Inventors: Byron A. Devlin, Parkville, MO (US); John H. Beard, Olathe, KS (US); Keith R. DeBald, Gardner, KS (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 17/387,535

(22) Filed: Jul. 28, 2021

(65) Prior Publication Data
US 2021/0353096 A1 Nov. 18, 2021

Related U.S. Application Data

(63) Continuation of application No. 16/505,833, filed on Jul. 9, 2019, now Pat. No. 11,103,102.

(51) Int. Cl.
*A47J 31/46* (2006.01)
*B64D 11/04* (2006.01)
(Continued)

(52) U.S. Cl.
CPC ............ *A47J 31/461* (2018.08); *B64D 11/04* (2013.01); *F16K 15/025* (2013.01);
(Continued)

(58) Field of Classification Search
CPC ... Y10T 137/7785; F16K 17/30; F16K 17/34; F16K 17/046; F16K 15/025; F16K 27/02;
(Continued)

(56) References Cited

U.S. PATENT DOCUMENTS 1,567,435 A * 12/1925 Gauger ............... G05D 23/132
137/503
2,093,015 A * 9/1937 Madden ................ B60T 11/32
137/465
(Continued)

FOREIGN PATENT DOCUMENTS

DE 3531175 A1 3/1987

OTHER PUBLICATIONS

Search Report for European Application No. 20180325.1 dated Nov. 16, 2020, 2 pages.

*Primary Examiner* — William M McCalister
(74) *Attorney, Agent, or Firm* — Suiter Swantz pc llo

(57) ABSTRACT

A vent valve flow fuse includes a valve cap with a valve cap cavity defined by one or more valve cap interior surfaces. The vent valve flow fuse includes a valve body with a valve body cavity defined by one or more valve body interior surfaces. The vent valve flow fuse includes a poppet configured to at least partially fit within the valve cap cavity and the valve body cavity. The vent valve flow fuse includes a spring configured to fit within the valve body cavity and to generate a resistive force against the poppet. The poppet is in a first position when fluid having a first amount of fluid pressure enters the valve cap cavity from a vent valve and engages the poppet. The poppet is in a second position when fluid having a second amount of fluid pressure enters the valve cap cavity and engages the poppet.

13 Claims, 10 Drawing Sheets

(51) Int. Cl.
*F16K 15/02* (2006.01)
*F16K 17/04* (2006.01)
*F16K 17/34* (2006.01)
*F16K 17/30* (2006.01)
*B64D 11/00* (2006.01)

(52) U.S. Cl.
CPC ............ *F16K 17/046* (2013.01); *F16K 17/30* (2013.01); *F16K 17/34* (2013.01); *B64D 11/0007* (2013.01)

(58) Field of Classification Search
CPC ..... G05D 7/0133; G05D 7/014; A47J 31/461; B64D 11/04; B64D 11/0007
USPC .......................................................... 137/498
See application file for complete search history.

(56) References Cited

U.S. PATENT DOCUMENTS

| | | | | |
|---|---|---|---|---|
| 2,268,733 A * | 1/1942 | Williams | ................... | F16P 3/22 251/16 |
| 2,411,392 A * | 11/1946 | Saville | ................... | B64C 25/22 91/468 |
| 2,418,743 A * | 4/1947 | Baker | ................... | F16K 17/32 137/460 |
| 2,633,147 A | 3/1953 | Dominic | | |
| 2,729,234 A * | 1/1956 | Stevenson | ............... | F16L 55/04 137/498 |
| 2,729,235 A * | 1/1956 | Stevenson | ............... | F15B 21/00 137/504 |
| 3,122,162 A * | 2/1964 | Sands | ................... | G05D 7/0133 137/516.25 |
| 3,327,730 A * | 6/1967 | Ransier | ................. | B60C 29/007 137/498 |
| 4,605,039 A * | 8/1986 | Johnson | ................... | F16K 17/30 137/460 |
| 4,809,740 A * | 3/1989 | Nevlud | ................... | F16K 17/24 137/460 |
| 4,962,831 A * | 10/1990 | Dundas | ................... | A62C 2/04 137/554 |
| 5,462,081 A * | 10/1995 | Perusek | ................. | F16K 17/30 137/498 |
| 5,474,105 A * | 12/1995 | Able | ................... | G05D 7/0126 137/503 |
| 6,112,758 A * | 9/2000 | Wooten | ................... | F16K 17/28 137/71 |
| 6,227,101 B1 | 5/2001 | Rabadi et al. | | |
| 6,443,180 B1 * | 9/2002 | Samuelson | ............. | F16K 24/02 137/460 |
| 7,591,282 B1 * | 9/2009 | Achterman | ............. | F16K 17/30 137/460 |
| 7,644,726 B1 * | 1/2010 | Achterman | ............. | F16K 17/30 137/516.25 |
| 2004/0182442 A1 * | 9/2004 | Frampton | ........... | F16K 31/1226 137/460 |
| 2009/0255592 A1 * | 10/2009 | Caccialupi | ............ | E21B 34/103 137/498 |
| 2012/0160347 A1 | 6/2012 | Laude | | |
| 2018/0106279 A1 | 4/2018 | Schiphorst et al. | | |
| 2021/0007544 A1 | 1/2021 | Devlin et al. | | |

\* cited by examiner

VENT VALVE FLOW FUSE

CROSS-REFERNECE TO RELATED APPLICATIONS

The present application is a continuation of U.S. patent application Ser. No. 16/505,833, titled VENT VALVE FLOW FUSE, filed Jul. 9, 2019, which is incorporated herein by reference in its entirety.

BACKGROUND

Aircraft brewing apparatuses may include a vent valve or other venting mechanism that is in direct fluid communication with an aircraft water supply system. The vent valve may allow water to fill or drain automatically with the aircraft water supply system. The vent valve may operate on the aircraft water system pressure to prevent a possible unsafe tank overpressure condition.

The vent valve may fail (e.g., due to scaling within the vent valve, oscillation failure of the vent valve, or damage of balls or seals within the vent valve) over time, which may allow water to freely flow into a drain reservoir via tubing of the brewing apparatus. The rate at which the water may freely flow into the drain reservoir via the tubing of the brewing apparatus may exceed the flow rate the drain reservoir and the tubing of the brewing apparatus is capable of handling, resulting in a possibility of leaking from the aircraft brewing apparatus (e.g., onto an aircraft galley floor of an aircraft).

SUMMARY

A vent valve flow fuse is disclosed. In one or more embodiments, the vent valve flow fuse includes a valve cap with a valve cap cavity defined by one or more valve cap interior surfaces. The vent valve flow fuse includes a valve body with a valve body cavity defined by one or more valve body interior surfaces. The vent valve flow fuse includes a poppet configured to at least partially fit within the valve cap cavity and at least partially fit within the valve body cavity. The vent valve flow fuse includes a spring configured to fit within the valve body cavity. The spring is further configured to generate a resistive force against the poppet. The poppet is in a first position when fluid having a first amount of fluid pressure enters the valve cap cavity from a vent valve in fluid communication with a fluid tank of an aircraft brewing apparatus and engages the poppet. The poppet is in a second position when fluid having a second amount of fluid pressure enters the valve cap cavity from the vent valve in fluid communication with the fluid tank of the aircraft brewing apparatus and engages the poppet.

In some embodiments of the vent valve flow fuse, the poppet further includes an inlet portion with an inlet cavity defined by one or more inlet interior surfaces and one or more inlet holes in fluid communication with the inlet cavity. The poppet further includes an outlet portion with an outlet cavity defined by one or more outlet interior surfaces and one or more outlet holes in fluid communication with the outlet cavity.

In some embodiments of the vent valve flow fuse, the vent valve flow fuse further includes a seal coupled to one or more exterior surfaces of the poppet.

In some embodiments of the vent valve flow fuse, the vent valve flow fuse is configured to allow the fluid having the first amount of fluid pressure to pass from the vent valve to a drain reservoir of the brewing apparatus when the poppet is in the first position.

In some embodiments of the vent valve flow fuse, the inlet portion of the poppet is positioned within the valve cap cavity. The outlet portion of the poppet is positioned within the valve body cavity and the valve cap cavity. The seal is positioned within the valve body cavity when the poppet is in the first position.

In some embodiments of the vent valve flow fuse, the fluid having the first amount of fluid pressure enters the inlet cavity from the vent valve, exits the inlet cavity via the first set of holes into the valve cap cavity, enters the outlet cavity via the second set of holes from the valve body cavity, and exits the outlet cavity of the poppet to the drain reservoir.

In some embodiments of the vent valve flow fuse, the vent valve flow fuse is configured to restrict fluid flow to a level not exceeding a flow rate of a drain reservoir of the brewing apparatus when the poppet is in the second position.

In some embodiments of the vent valve flow fuse, the inlet portion of the poppet is positioned within the valve body cavity. The outlet portion of the poppet is positioned within the valve body cavity. The seal is in contact with the one or more valve body interior surfaces when the poppet is in the second position.

In some embodiments of the vent valve flow fuse, the fluid having the second amount of fluid pressure enters the inlet cavity defined by one or more inlet interior surfaces of the poppet from the vent valve and exits the inlet cavity via a first set of holes in the poppet into the valve cap cavity. The fluid having the second fluid pressure is blocked from entering the one or more outlet holes by the seal engaging the one or more valve body interior surfaces.

In some embodiments of the vent valve flow fuse, a diameter of the one or more inlet holes is less than a diameter of the one or more outlet holes.

In some embodiments of the vent valve flow fuse, the first amount of fluid pressure is less than the second amount of fluid pressure.

In some embodiments of the vent valve flow fuse, the first amount of fluid pressure is less than the resistive force generated by the spring. The second amount of fluid pressure is greater than the resistive force generated by the spring.

In some embodiments of the vent valve flow fuse, the vent valve flow fuse further includes a seal inserted between one or more exterior surfaces of the valve cap and the one or more valve body interior surfaces. The seal is configured to prevent fluid leakage between the valve cap and the valve body.

In some embodiments of the vent valve flow fuse, the aircraft brewing apparatus is installed within an aircraft galley of an aircraft.

An aircraft brewing apparatus is also disclosed. In one or more embodiments, the aircraft brewing apparatus includes a vent valve in fluid communication with a fluid tank. The aircraft brewing apparatus further includes a drain reservoir. The aircraft brewing apparatus further includes a vent valve flow fuse in fluid communication with the vent valve and the drain reservoir. The vent valve flow fuse includes a valve cap with a valve cap cavity defined by one or more valve cap interior surfaces. The vent valve flow fuse includes a valve body with a valve body cavity defined by one or more valve body interior surfaces. The vent valve flow fuse includes a poppet configured to at least partially fit within the valve cap cavity and at least partially fit within the valve body cavity. The vent valve flow fuse includes a spring configured to fit within the valve body cavity. The spring is further configured to generate a resistive force against the poppet. The poppet is in a first position when fluid having a first amount of fluid pressure enters the valve cap cavity from the vent valve and engages the poppet. The poppet is in a second position when fluid having a second amount of fluid pressure enters the valve cap cavity from the vent valve and engages the poppet.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1B:
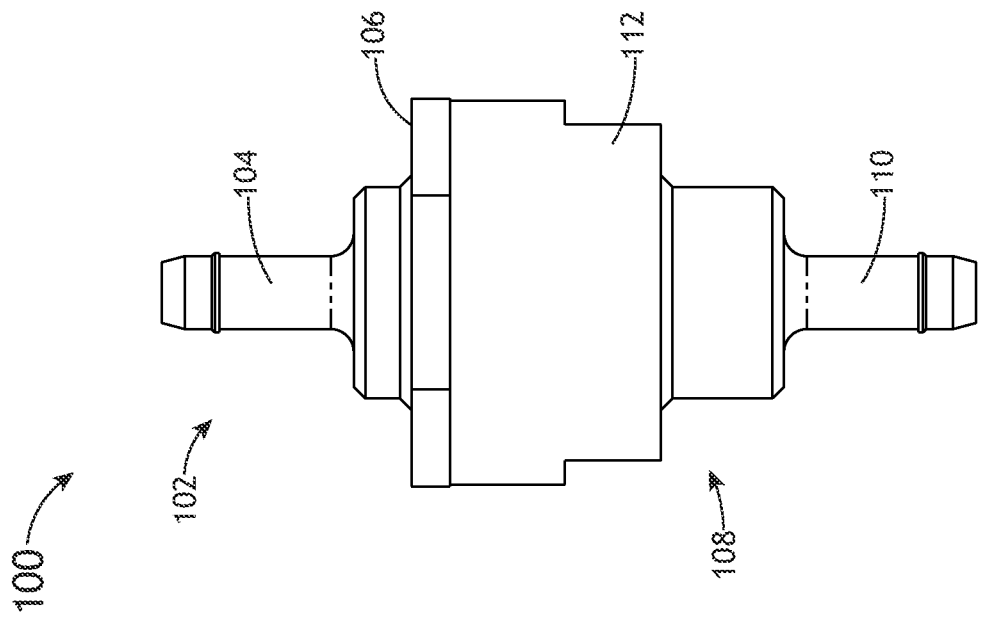
FIG. 1B is an elevation view of a vent valve flow fuse, in accordance with one or more embodiments of the disclosure.

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1A-9 generally illustrate a vent valve flow fuse 100, in accordance with one or more embodiments of the disclosure. It is noted herein that "vent valve flow fuse 100" and variants of the term "vent valve flow fuse 100" (e.g., "flow fuse 100," or the like) may be considered equivalent for purposes of the disclosure.

Figure 1A:
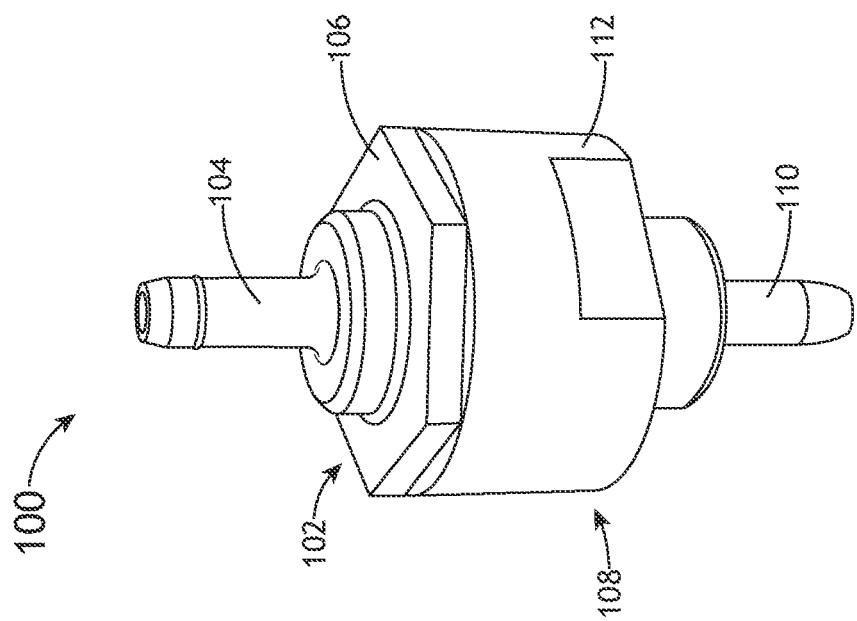
FIG. 1A is a perspective view of a vent valve flow fuse, in accordance with one or more embodiments of the disclosure.

FIGS. 1A and 1B illustrate the vent valve flow fuse 100, in accordance with one or more embodiments of the disclosure. The vent valve flow fuse 100 may include a valve cap 102. The valve cap 102 may include a valve cap connector 104. The valve cap 102 may include one or more surfaces 106 with which a tool (e.g., a wrench, pliers, or the like) may engage. For example, the tool may be configured to grip onto the one or more surfaces 106 when constructing the vent valve flow fuse 100.

The vent valve flow fuse 100 may include a valve body 108. The valve body 108 may include a valve body connector 110. The valve body 108 may include one or more surfaces 112 with which a tool (e.g., a wrench, pliers, or the like) may engage. For example, the tool may be configured to grip onto the one or more surfaces 112 when constructing the vent valve flow fuse 100. For instance, the tool may be configured to grip onto the one or more surfaces 112 when tightening the valve cap 102 onto the valve body 108 and/or removing the valve cap 102 from the valve body 108.

Figure 2:
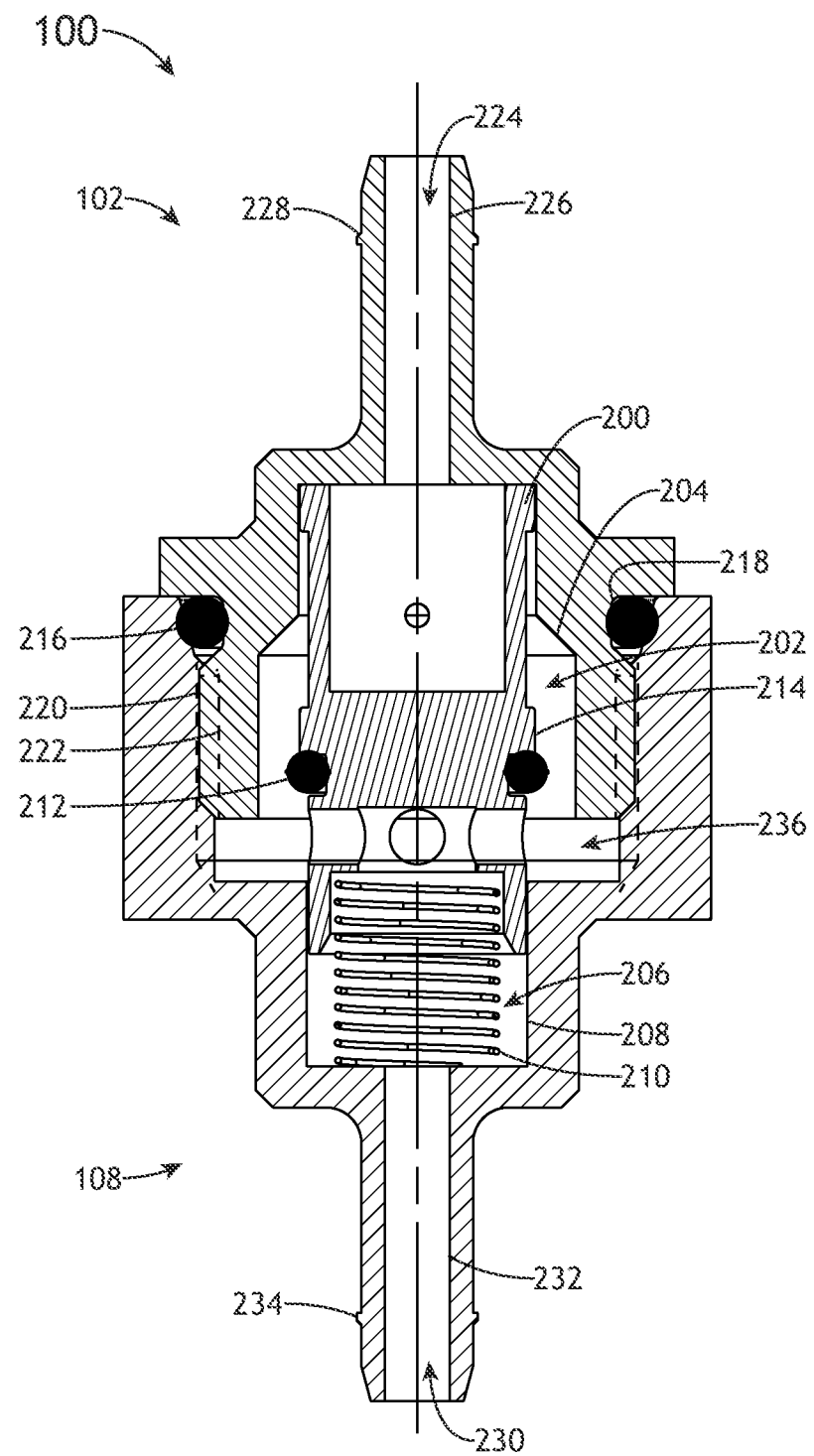
FIG. 2 is a cross-section view of a vent valve flow fuse, in accordance with one or more embodiments of the disclosure.
Figure 3:
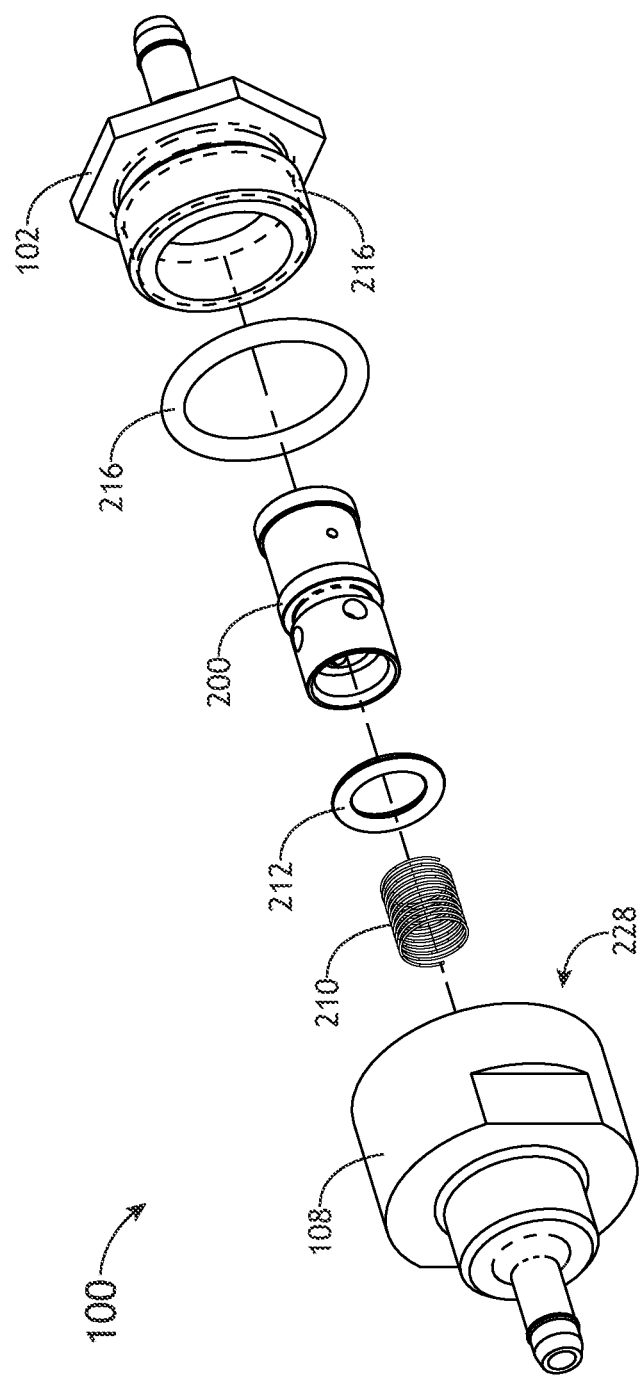
FIG. 3 is an exploded perspective view of a vent valve flow fuse, in accordance with one or more embodiments of the disclosure.

FIGS. 2 and 3 illustrate the vent valve flow fuse 100, in accordance with one or more embodiments of the disclosure. The vent valve flow fuse 100 may include a poppet 200. At least a first portion of the poppet 200 may be configured to fit within a valve cap cavity 202 defined by one or more interior surfaces 204 of the valve cap 102. At least a second portion of the poppet 200 may be configured to fit within a valve body cavity 206 defined by one or more interior surfaces 208 of the valve body 108.

The vent valve flow fuse 100 may include a spring 210. The spring 210 may be configured to fit within the valve body cavity 206 defined by the one or more interior surfaces 208 of the valve body 108.

The vent valve flow fuse 100 may include a seal 212. The seal 212 may be coupled to one or more exterior surfaces 214 of the poppet 200. For example, the seal 212 may be positioned within the valve cap cavity 202 when the poppet 200 is in a first position. By way of another example, the seal 212 may be positioned within the valve body cavity 206 and may engage the one or more interior surfaces 208 of the valve body 108 when the poppet 200 is in a second position. It is noted herein that fluid flow within the vent valve flow fuse 100 may be cut off when the poppet 200 is in the second position.

The vent valve flow fuse 100 may include a seal 216. The seal 216 may be inserted between one or more exterior surfaces 218 of the valve cap 102 and the one or more interior surfaces 208 of the valve body 108.

The valve cap 102 and the valve body 108 may be coupled together. For example, the valve cap 102 and the valve body 108 may include complementary components of a coupling assembly. For instance, the coupling assembly may be a set of interlocking threads, such that the valve cap 102 and the valve body 108 may include complementary threading 220 and 222, respectively. Generally, the valve cap 102 and the valve body 108 may include complementary components of any coupling assembly known in the art (e.g., a tongue-and-groove assembly, a tab-and-slot assembly, a friction clip assembly, a latching assembly, or the like). By way of another example, the valve cap 102 and the valve body 108 may be coupled together via such that the valve cap 102 and the valve body 108 may not require a coupling assembly including, but not limited to, any of a fastener, an adhesive, or an interference fit.

It is noted herein that the seal 216 may be positioned between the valve cap 102 and the valve body 108 such that the seal 216 may be configured to prevent leakage from the interior cavities 202, 206 of the vent valve flow fuse 100 when the valve cap 102 is coupled to the valve body 108.

The valve cap 102 may include a valve cap connector cavity 224 defined by one or more interior surfaces 226 of the valve cap connector 104. The valve cap 102 may include one or more tube or hose couplers 228 on the valve cap connector 104. For example, the one or more tube or hose couplers 228 may include, but are not limited to, one or more hose barbs, threading (e.g., a male or female-threaded port), a push-to-connect fitting, an external clamp, or any other tube or hose coupler known in the art.

The valve body 108 may include a valve body connector cavity 230 defined by one or more interior surfaces 232 of the valve body connector 110. The valve body 108 may include one or more tube or hose couplers 234 on the valve body connector 110. For example, the one or more tube or hose couplers 234 may include, but are not limited to, one or more hose barbs, threading (e.g., a male or female-threaded port), a push-to-connect fitting, an external clamp, or any other tube or hose coupler known in the art.

The valve cap cavity 202 may be proximate to and in fluid communication with the valve body cavity 206, such that a combined cavity formed by at least a portion of the valve cap cavity 202 and at least a portion of the valve body cavity 206 may be considered a flow fuse cavity 236.

Figure 4:
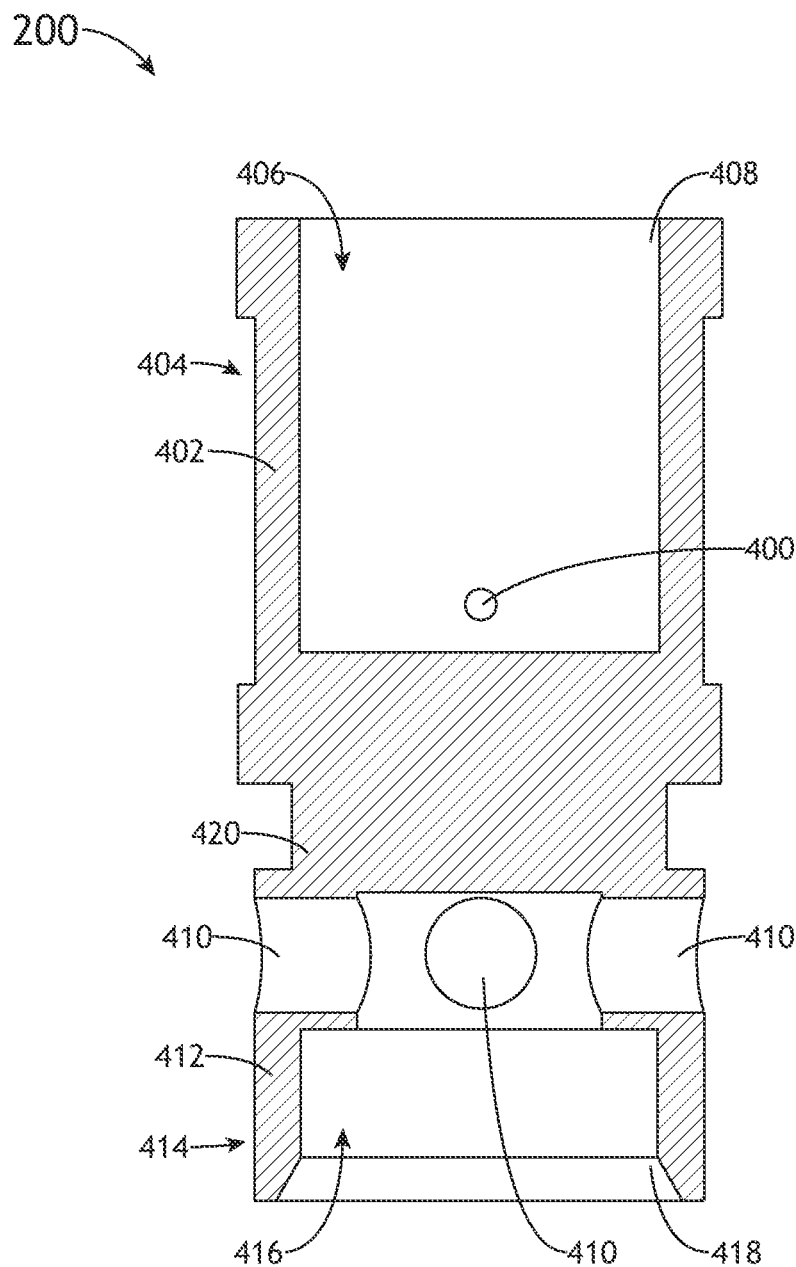
FIG. 4 is a cross-section view of a poppet of a vent valve flow fuse, in accordance with one or more embodiments of the disclosure.

FIG. 4 illustrates the poppet 200 of the vent valve flow fuse 100, in accordance with one or more embodiments of the disclosure. The poppet 200 may include one or more inlet holes 400. The one or more inlet holes 400 may be cut through one or more inlet sidewalls 402 of an inlet portion 404 of the poppet 200. The one or more inlet holes 400 may fluidly couple the valve cap cavity 202 and an inlet cavity 406 defined by one or more inlet interior surfaces 408 of the inlet portion 404 of the poppet 200.

The poppet 200 may include one or more outlet holes 410. The one or more outlet holes 410 may be cut through one or more outlet sidewalls 412 of an outlet portion 414 of the poppet 200. The one or more outlet holes 410 may fluidly couple the valve body cavity 206 and an outlet cavity 416 defined by one or more outlet interior surfaces 418 of the outlet portion 414 of the poppet 200.

The inlet cavity 406 and the outlet cavity 216 may be separated by a wall 420 of the poppet 200.

The one or more inlet holes 400 and the one or more outlet holes 410 may be of a select size. For example, a diameter of the one or more inlet holes 400 may be less than a diameter of the one or more outlet holes 410, such that the one or more inlet holes 400 are small-sized and the one or more outlet holes 410 are large-sized. For instance, the one or more inlet holes 400 being small-sized and the one or more outlet holes 410 being large-sized may permit a venting of air and may allow a small or minimal flow of water through the poppet 200 without causing the vent valve flow fuse 100 to close.

Although embodiments are directed to the one or more inlet holes 400 being small-sized and the one or more outlet holes 410 being large-sized, it is noted herein that a diameter of the one or more inlet holes 400 may be greater than a diameter of the one or more outlet holes 410, such that the one or more inlet holes 400 are large-sized and the one or more outlet holes 410 are small-sized. Therefore, the above description should not be interpreted as a limitation on the disclosure but merely an illustration.

Figure 5:
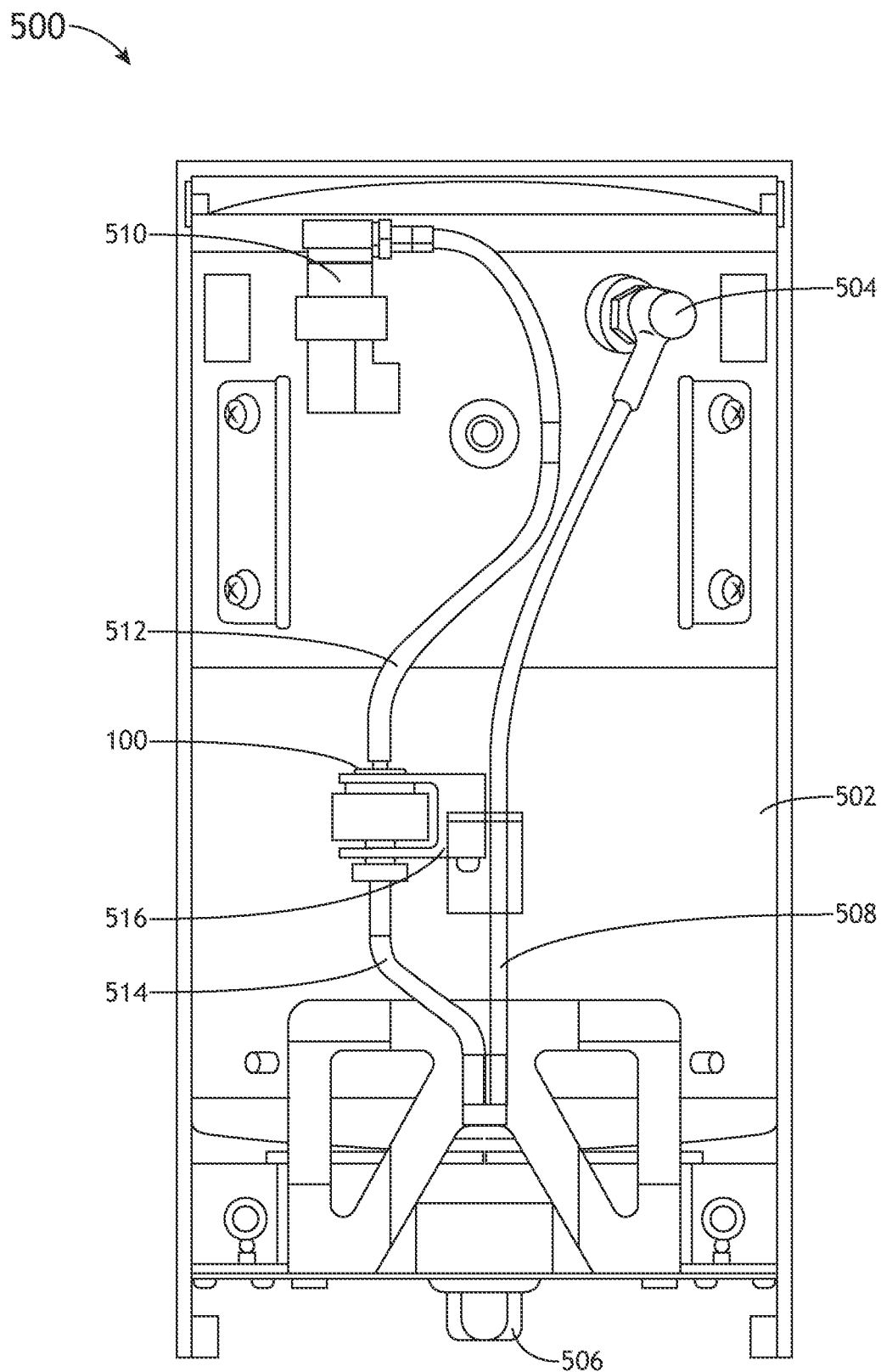
FIG. 5 is a rear elevation view of a brewing apparatus including a vent valve flow fuse, in accordance with one or more embodiments of the disclosure.

FIG. 5 illustrates the brewing apparatus 500 including the vent valve flow fuse 100, in accordance with one or more embodiments of the disclosure.

Generally, the brewing apparatus 500 may house one or more components of a brewing system. For example, the brewing system may include one or more heating subsystems with any number of heating components known in the art (e.g., one or more heating elements, one or more heat-resistant components, or the like). By way of another example, the brewing system may include one or more plumbing subsystems with any number of plumbing components known in the art (e.g., fluidic components including one or more pipes and pipe couplers, one or more tubes and tube couplers, or the like). By way of another example, the brewing system may include one or more electrical subsystems with any number of electrical components known in the art (e.g., one or more wire harnesses, one or more terminal blocks, one or more sensors, or the like). It is noted herein the various systems and subsystems within the brewing apparatus 500 may share any number of components.

The brewing apparatus 500 may include a water tank 502. The brewing apparatus 500 may include a pressure relief valve 504. The pressure relief valve 504 may be in fluid communication with the water tank 502.

The brewing apparatus 500 may include a drain reservoir 506. The pressure relief valve 504 may drain into the drain reservoir 506 via one or more tubes 508.

The brewing apparatus 500 may include a vent valve 510. The vent valve 510 may be in fluid communication with the water tank 502.

The brewing apparatus 500 may include the vent valve flow fuse 100. The vent valve flow fuse 100 may be in fluid communication with the vent valve 510 via one or more tubes 512. For example, the vent valve flow fuse 100 may operate as a safety backup to the vent valve 510 by either restricting or stopping the water flow from the brewing apparatus 500 without impeding normal operation of the brewing apparatus 500. The vent valve flow fuse 100 may drain into the drain reservoir 506 via one or more tubes 514.

The vent valve flow fuse 100 may be coupled to the one or more tubes 512 and/or 514 via any tube or hose coupler known in the art. For example, the vent valve flow fuse 100 may include the one or more tube or hose couplers 228 on the valve cap connector 104, to which the one or more tubes 512 may couple. By way of another example, the vent valve flow fuse 100 may include the one or more tube or hose couplers 234 on the valve body connector 110, to which the one or more tubes 514 may couple.

The vent valve 510 may be coupled to one or more other components of the brewing apparatus 500. For example, the vent valve 510 may be coupled to a surface of the water tank 502 via a bracket 516. For instance, the bracket 516 may mount to currently-existing hardware on the surface of the water tank 502. It is noted herein, however, that the bracket 516 may be a standalone part or a part requiring additional components for integration into the brewing apparatus 500.

Figure 6:
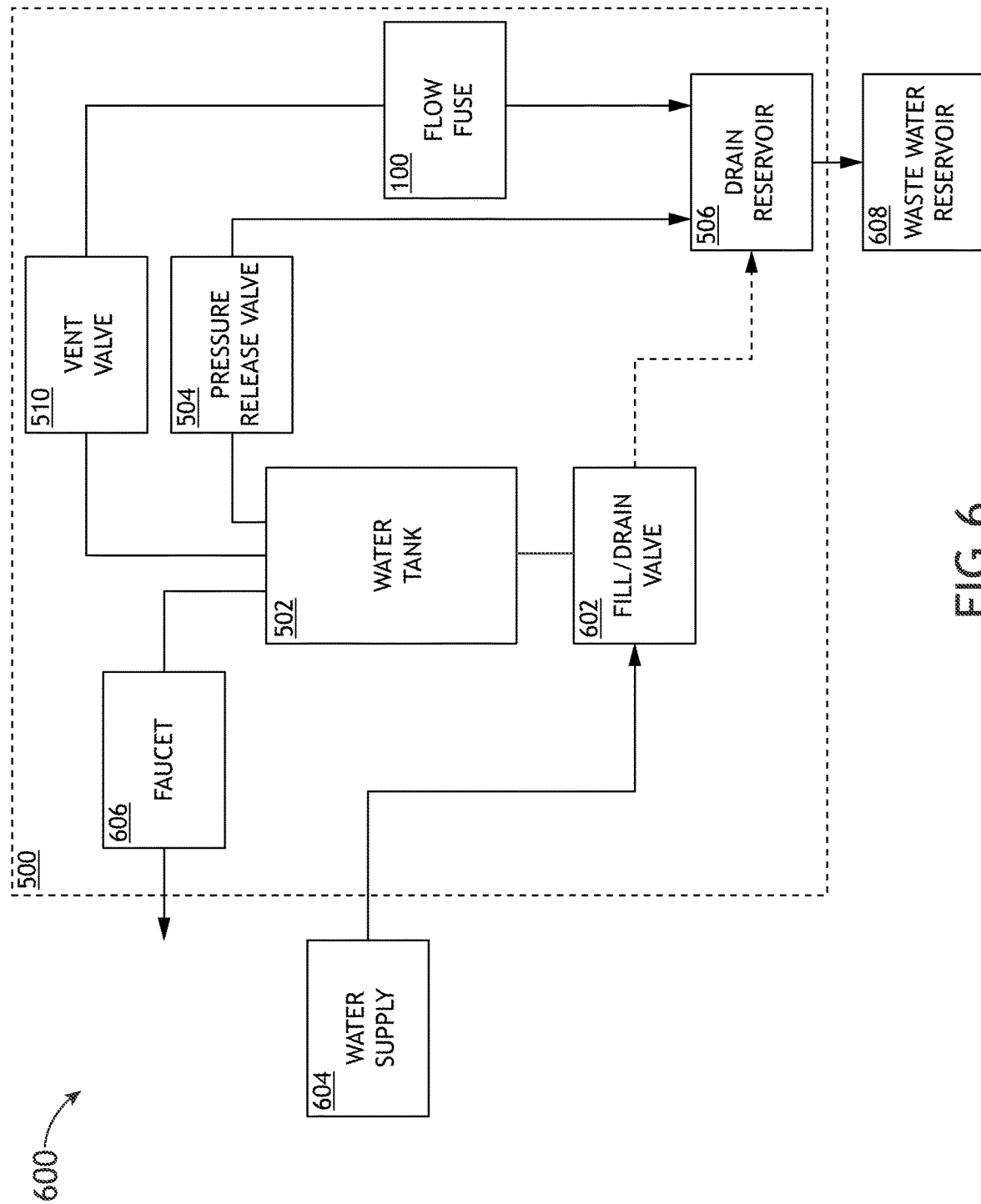
FIG. 6 is a block diagram illustrating an aircraft with a brewing apparatus including a vent valve flow fuse, in accordance with one or more embodiments of the disclosure.

FIG. 6 illustrates a block diagram of an aircraft 600 including the brewing apparatus 500 with the vent valve flow fuse 100, in accordance with one or more embodiments of the disclosure.

The brewing apparatus 500 may include a valve 602. The valve 602 may operate as a fill valve, where the water tank 602 of the brewing apparatus 500 may be filled from a water supply 604 of the aircraft 600 via the valve 602. The valve 602 may (in addition or in the alterative) operate as a drain valve, where the water tank 602 may be drained into the drain reservoir 606 of the brewing apparatus 500 via the valve 602.

The brewing apparatus 500 may include a faucet 606. The water tank 502 of the brewing apparatus 500 may dispense water via the faucet 606. In an instance where the vent valve 510 of the brewing apparatus 500 fails, the brewing apparatus 500 may leak from underneath the faucet 606 (e.g., onto a floor of an aircraft galley 700, as illustrated in FIG. 7, of the aircraft 600) via a weep hole in fluid communication with a secondary drain line, where the secondary drain line may branch from a main drain line fluidly coupling the vent valve 510 and the drain reservoir 506.

The aircraft 600 may include a waste water reservoir 608. The drain reservoir 506 of the brewing apparatus 500 may empty into the waste water reservoir 608.

Figure 7:
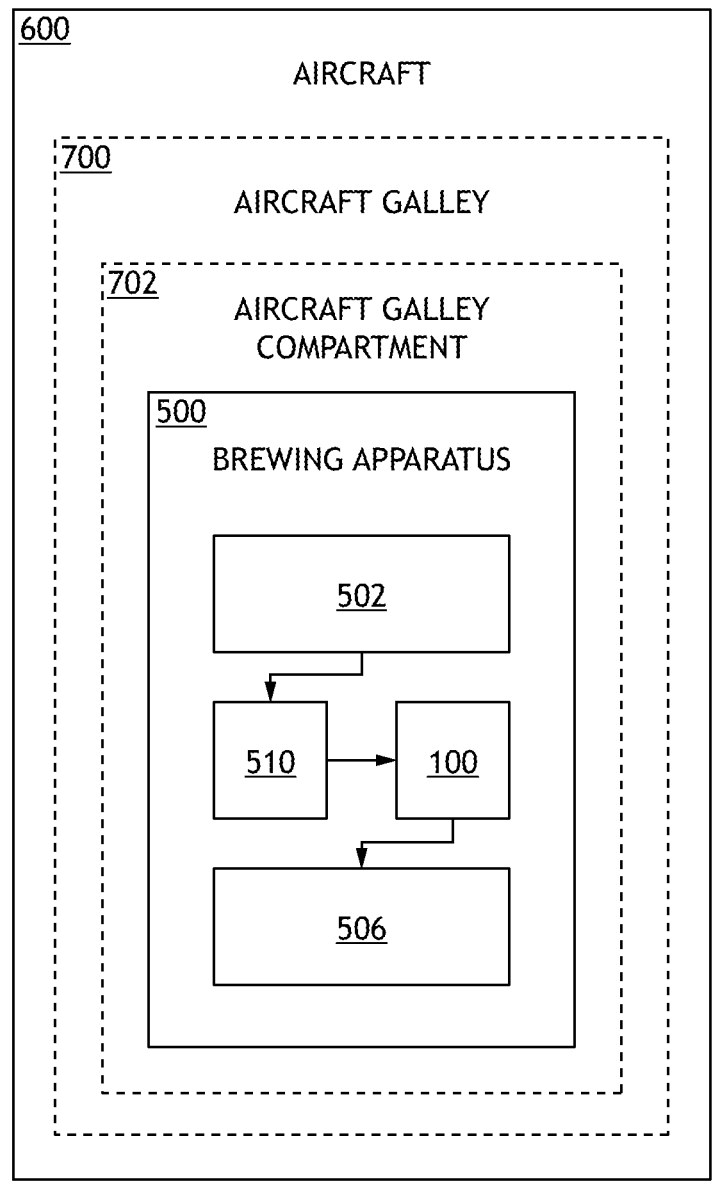
FIG. 7 is a block diagram illustrating an aircraft with a brewing apparatus including a vent valve flow fuse, in accordance with one or more embodiments of the disclosure.

FIG. 7 illustrates a block diagram of an aircraft 600 including the brewing apparatus 500 with the vent valve flow fuse 100, in accordance with one or more embodiments of the disclosure.

The aircraft 600 may include an aircraft galley 700. The aircraft galley 700 may include an aircraft galley compartment 702, in which the brewing apparatus 500 including the vent valve 510 and the vent valve flow fuse 100 may be installed and/or configured or dimensioned to fit. The aircraft water supply 602 from which the water tank 502 receives water may be installed and/or configured or dimensioned to fit within any of the aircraft 600, the aircraft galley 700, and/or the aircraft galley compartment 702 (although not illustrated). The waste water reservoir 608 into which the drain reservoir 506 empties may be installed and/or configured or dimensioned to fit within any of the aircraft 600, the aircraft galley 700, and/or the aircraft galley compartment 702 (although not illustrated).

Although embodiments of the disclosure are directed to the brewing apparatus 500 including the vent valve flow fuse 100 being installed and/or configured or dimensioned to fit within an aircraft 600, it is noted herein that the brewing apparatus 500 including the vent valve flow fuse 100 may instead be installed and/or configured or dimensioned to fit within any type of vehicle known in the art. For example, the vehicle may be any air, land, or water-based personal equipment or vehicle; any air, land, or water-based commercial equipment or vehicle; any air, land, or water-based military equipment or vehicle known in the art. In addition, it is noted herein the brewing apparatus 500 may be a stand-alone device configured to operate within a home or a business. For example, the brewing apparatus 500 may be a device sold for commercial or industrial use in either a home or a business. In this regard, the brewing apparatus 500 may not be installed and/or configured or dimensioned to fit within the aircraft 600. Therefore, the above description should not be interpreted as a limitation on the disclosure but merely an illustration.

Figure 8A:
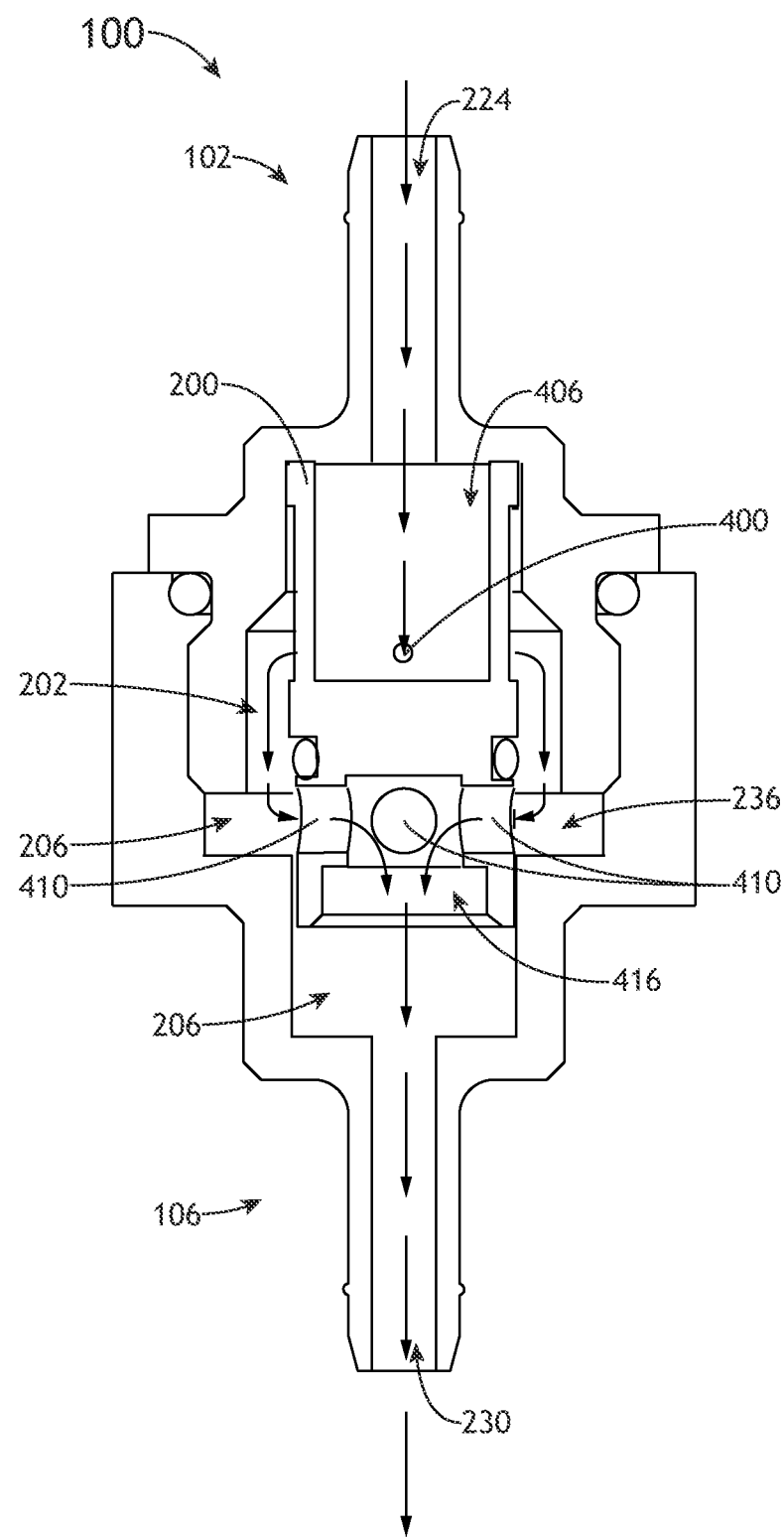
FIG. 8A is a cross-section view of a vent valve flow fuse, in accordance with one or more embodiments of the disclosure.
Figure 8B:
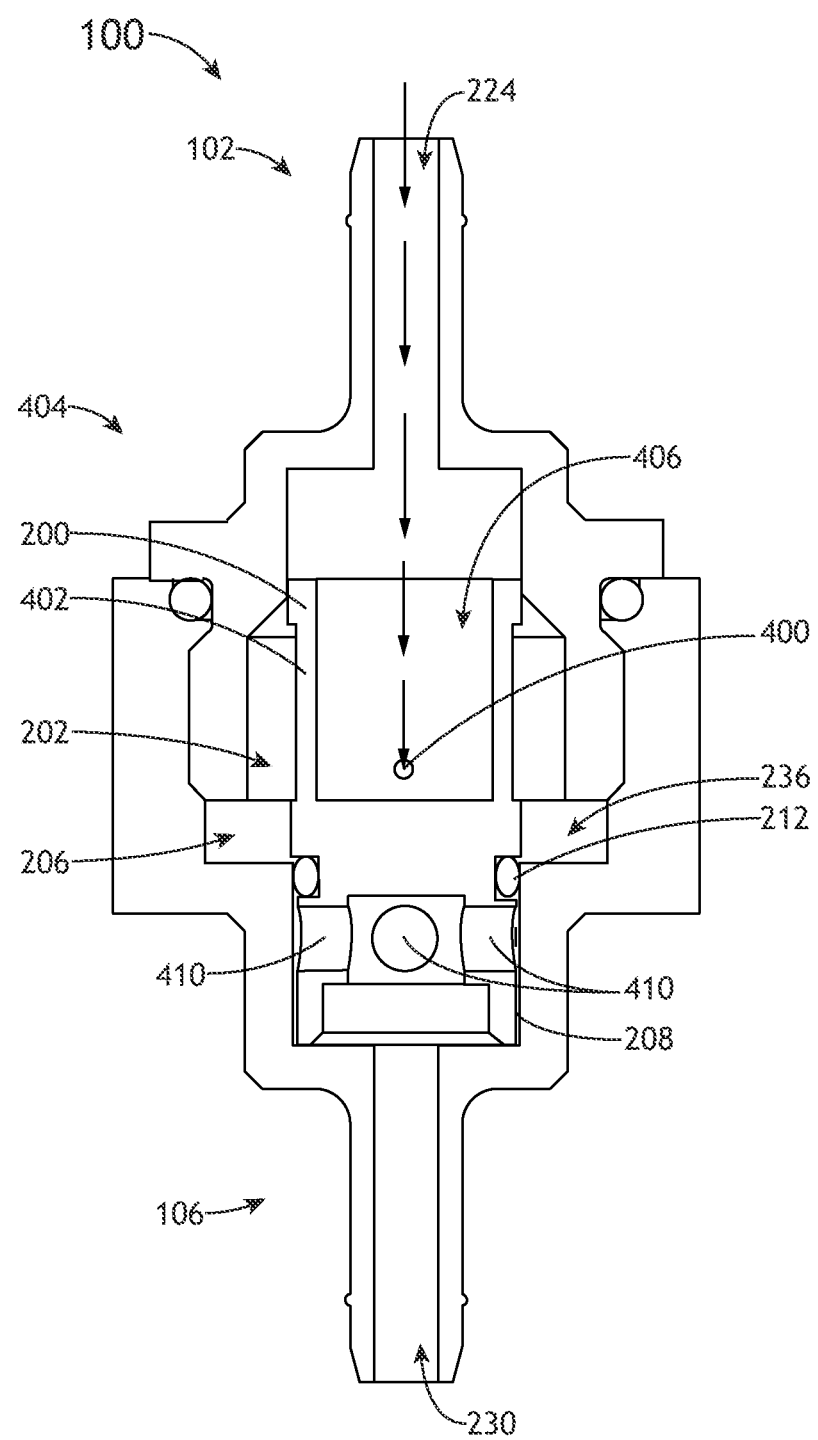
FIG. 8B is a cross-section view of a vent valve flow fuse, in accordance with one or more embodiments of the disclosure.

FIGS. 8A and 8B generally illustrate operational states of the poppet 200 of the vent valve flow fuse 100, in accordance with one or more embodiments of the disclosure. It is noted herein that FIGS. 8A and 8B illustrate the poppet 200 as including one or more small-sized inlet holes 400 and one or more large-sized outlet holes 410.

Referring now to FIG. 8A, the poppet 200 may be in a first position during normal operation of the vent valve 510 (e.g., as illustrated in FIG. 5). In the first position, a fluid (e.g., air and/or a volume of low-pressure water) may be allowed to escape the water tank 502 (e.g., as illustrated in FIG. 5) by flowing freely through the vent valve 510 and the flow fuse cavity 236 of the vent valve flow fuse 100 into the drain reservoir 506 (e.g., as illustrated in FIG. 5). For example, the fluid may enter the vent valve flow fuse 100 via the valve cap connector cavity 224 of the valve cap 102. Next, the fluid may enter the poppet 200 via the inlet cavity 406 and exit the poppet 200 into the valve cap cavity 202 and a first portion of the valve body cavity 206 via the one or more small-sized inlet holes 400. The fluid may then enter the poppet 200 via the one or more large-sized outlet holes 410. The fluid may then exit the poppet 200 into a second portion of the valve body cavity 206 via the outlet cavity 416. Finally, the fluid may exit the vent valve flow fuse 100 via the valve body connector cavity 230 of the valve body 108.

Although a volume of low-pressure water from the vent valve 510 may leak into the vent valve flow fuse 100 while the poppet 200 is in the first position, the volume of low-pressure water should not affect the vent valve flow fuse 100 and thus should drain into the drain reservoir 506 (e.g., as illustrated in FIG. 5). However, should the vent valve 510 fail (e.g., due to scaling within the vent valve, oscillation failure of the vent valve, or damage of balls or seals within the vent valve), a volume of high-pressure water may exit the vent valve 510 and enter the vent valve flow fuse 100 and the vent valve 510 may translate into a second position.

Referring now to FIG. 8B, the poppet 200 may be in the second position following a failure of the vent valve 510 (e.g., as illustrated in FIG. 5), where the flow fuse cavity 236 of the vent valve flow fuse 100 is sealed closed. For example, the volume of high-pressure water may enter the vent valve flow fuse 100 via the valve cap connector cavity 224 of the valve cap 102. Next, the volume of high-pressure water may enter the poppet 200 via the inlet cavity 406 and exit the poppet 200 into the valve cap cavity 202 and a first portion of the valve body cavity 206 via the one or more small-sized inlet holes 400, surrounding the one or more inlet sidewalls 402 of the inlet portion 404 of the poppet 200.

The one or more small-sized inlet holes 400 may restrict flow of the volume of high-pressure water from the vent valve flow fuse 100, resulting in a pressure differential across the poppet 200. The high-pressure water on the top of the poppet 200 may act against a resistive force applied to the poppet 200 by the spring 210, translating the poppet 200 in a first (e.g., downward) direction. With enough water pressure, the poppet 200 may translate in the first direction until it comes to rest in the second position, acting against the resistive force applied to the poppet 200 by the spring 210. In the second position, the seal 212 may engage the one or more interior surfaces 208 of the valve body 108. The seal 212 and/or the one or more interior surfaces 208 of the valve body 108 may block the one or more large-sized outlet holes 410, preventing water flow through the vent valve flow fuse 100. The poppet 200 may remain seated in the second position until water system pressure (e.g., the pressure of the water provided by the vent valve 510 to the flow fuse 100) drops low enough to allow the spring 210 to return the poppet 200 to the first position via translation in a second (e.g., upward) direction.

It is noted herein that the spring 210 is removed from FIGS. 8A and 8B for ease of viewing. In addition, although the poppet 200 is illustrated as adjacent to a bottom surface of the valve body cavity 206 when in the second position, it is noted herein that the poppet 200 may be separated from the bottom surface of the valve body cavity 206 by an amount equal or substantially equal to a length of the spring 210 (e.g., a length of the spring 210 at full compression, or the like) when in the second position. Therefore, the above description should not be interpreted as a limitation on the disclosure but merely an illustration.

A diameter of the one or more inlet holes 400, a diameter of the one or more outlet holes 410, and/or a spring rate of the spring 210 may be selected to allow for adjustment of one or more of the water system pressure and/or water flow rate through the vent valve flow fuse 100 before the poppet 200 is seated in the second position (e.g., is sealed closed). Generally, the vent valve flow fuse 100 may be operable with any brewing apparatus 500 including a water heater or pressurized water tank where flow rates of the brewing apparatus 500 are known, such that the diameter of the inlet hole 400, the diameter of an outlet hole 410, and/or the spring rate of the spring 210 may be selected in response to the known flow rates of the brewing apparatus 500.

It is noted herein that water pressure of an aircraft water system may range from 1 pounds per square inch (psi) to 60 psi. As such, the adjustment of one or more of the water system pressure and/or water flow rate may allow the vent valve flow fuse 100 to be configured to close during a failure of the vent valve 510 at a very low pressure (e.g., below 1 psi). In addition, this adjustment may allow the vent valve flow fuse 100 to be configured restrict fluid flow through the poppet 200 to a level that would not exceed the flow rate of the drain reservoir 506. In this regard, the vent valve flow fuse 100 may ensure that the drain reservoir 506 may not overflow in the event of a failure of the vent valve 510.

It is noted herein that the vent valve flow fuse 100 may remove the need for a secondary drain tube and weep hole underneath the faucet 606 indicating a failure of the vent valve 510. In addition, it is noted herein that the vent valve flow fuse 100 may be fully mechanical in design, not requiring inputs or outputs to a controller and/or to software to operate. Being fully mechanical in design may ensure that the vent valve flow fuse 100 operates as a reliable backup to stop flow during a failure of the vent valve 510. Being fully mechanical in design may also allow for a more compact, in-line arrangement that may be quickly installed on brewing apparatuses 500 during production (e.g., on a production line) or via retroactive application (e.g., in the field, in a shop, or the like). For example, a technician may be able to install the vent valve flow fuse 100 via retroactive application by disconnecting a drain line from the vent valve 510 to the drain reservoir 506 from the bracket 516 (e.g., as illustrated in FIG. 5), couple the vent valve flow fuse 100 to the bracket 516, fluidly couple the drain line to the vent valve flow fuse 100, and fluidly couple a new drain line from the vent valve flow fuse 100 to the drain reservoir in a very short period of time.

Although embodiments are directed to the vent valve flow fuse 100 being fully mechanical, it is noted herein that the vent valve flow fuse 100 may include sensing elements configured to alert a cabin crew or a ground maintenance crew of a failure of the vent valve 510.

Figure 9:
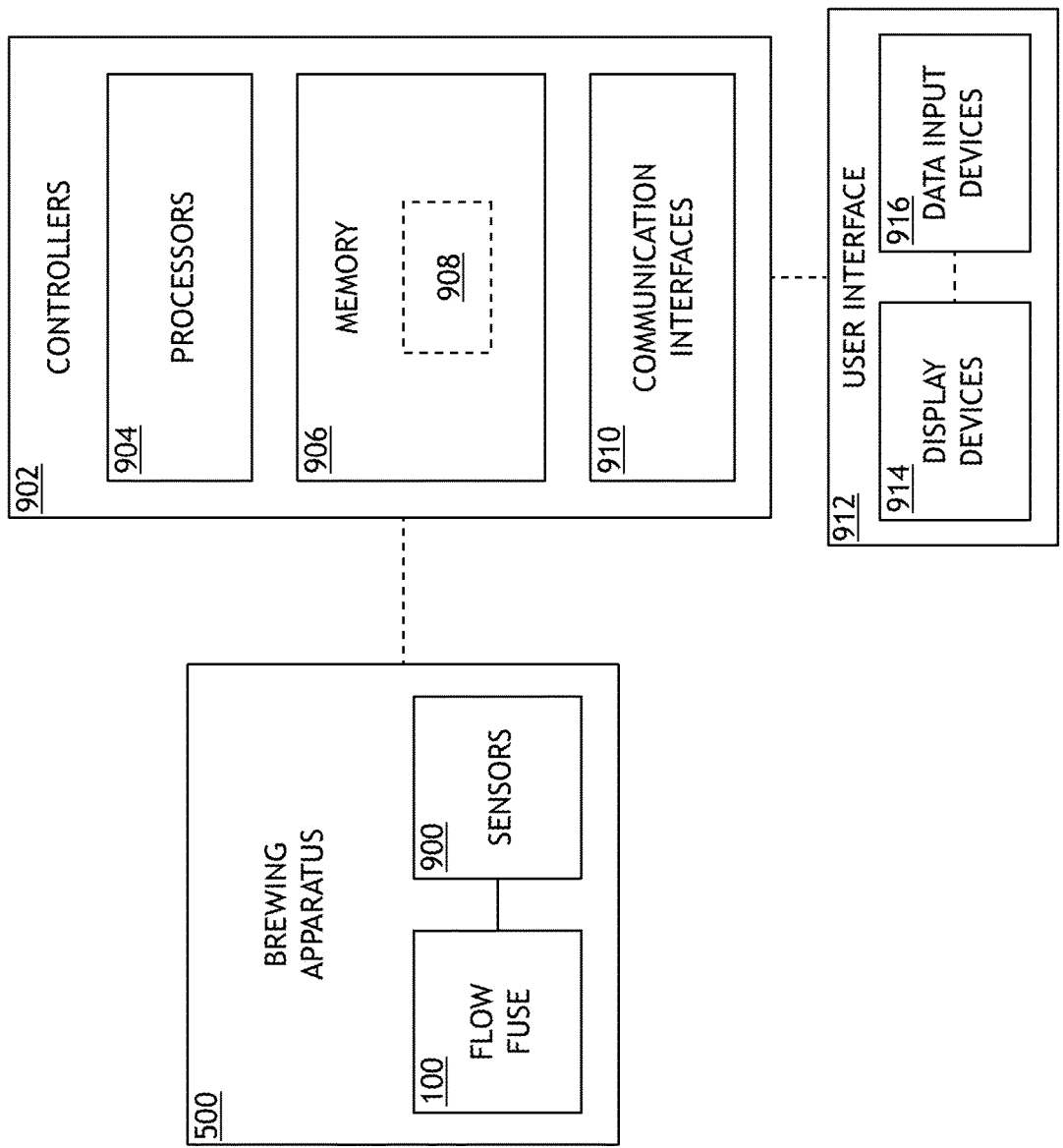
FIG. 9 is a block diagram illustrating an aircraft with a brewing apparatus including a vent valve flow fuse, in accordance with one or more embodiments of the disclosure.

FIG. 9 illustrates a block diagram of the brewing apparatus 500 with the vent valve flow fuse 100, in accordance with one or more embodiments of the disclosure.

The brewing apparatus 500 may include one or more sensors 900 communicatively coupled to the vent valve flow fuse 100. For example, the one or more sensors 900 may include, but are not limited to, one or more magnetic sensors, one or more reed switch sensors, one or more pressure sensors, or other sensors configured to be able to determine when the poppet 200 is in the second position and the vent valve flow fuse 100 is sealed closed.

The brewing apparatus 500 may be coupled to one or more controllers 902. The one or more controllers 902 may be housed within the aircraft 600 (not shown). The one or more controllers 902 may be communicatively coupled with an onboard galley network controller of the aircraft 600 (not shown). For example, the one or more controllers 902 may be configured to transmit data to and/or receive data from the onboard galley network controller of the aircraft 600. By way of another example, the one or more controllers 902 may be configured to record event logs and may transmit the event logs to the onboard galley network controller of the aircraft 600. By way of another example, the one or more controllers 902 may be configured to receive information and/or commands from the onboard galley network controller of the aircraft 600, either in response to or independent of transmitted event logs.

The one or more controllers 902 may be communicatively coupled with an offboard ground maintenance crew controller (although not shown). For example, the one or more controllers 902 may be configured to transmit data to and/or receive data from the offboard ground maintenance crew controller. By way of another example, the one or more controllers 902 may be configured to record event logs and may transmit the event logs to the offboard ground maintenance crew controller. By way of another example, the one or more controllers 902 may be configured to receive information and/or commands from the offboard ground maintenance crew controller, either in response to or independent of transmitted event logs.

The one or more controllers 902 may include at least one of one or more processors 904, memory 906 configured to store one or more sets of program instructions 908, and/or one or more communication interfaces 910.

The one or more controllers 902 may be communicatively coupled to one or more user interfaces 912. The one or more user interfaces 912 may include and/or be configured to interact with one or more display devices 914. The one or more user interfaces 912 may include and/or be configured to interact with one or more data input devices 916.

The one or more processors 904 provides processing functionality for at least the one or more controllers 902 and may include any number of processors, micro-controllers, circuitry, field programmable gate array (FPGA) or other processing systems, and resident or external memory for storing data, executable code, and other information accessed or generated by the one or more controllers 902. The one or more processors 904 may execute one or more software programs (e.g., the one or more sets of program instructions 908) embodied in a non-transitory computer readable medium (e.g., the memory 906) that implement techniques described herein. The one or more processors 904 are not limited by the materials from which it is formed or the processing mechanisms employed therein and, as such, may be implemented via semiconductor(s) and/or transistors (e.g., using electronic integrated circuit (IC) components), and so forth.

The memory 906 may be an example of tangible, computer-readable storage medium that provides storage functionality to store various data and/or program code associated with operation of the one or more controllers 902 and/or one or more processors 904, such as software programs and/or code segments, or other data to instruct the one or more processors 904 and/or other components of the one or more controllers 902, to perform the functionality described herein. Thus, the memory 906 may store data, such as a program of instructions for operating the one or more controllers 902, including its components (e.g., one or more processors 904, the one or more communication interfaces 910, or the like), and so forth. It should be noted that while a single memory 906 is described, a wide variety of types and combinations of memory (e.g., tangible, non-transitory memory) may be employed. The memory 906 may be integral with the one or more processors 904, may include stand-alone memory, or may be a combination of both. Some examples of the memory 906 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The one or more controllers 902 may be configured to perform one or more process steps, as defined by the one or more sets of program instructions 908. The one or more process steps may be performed iteratively, concurrently, and/or sequentially. The one or more sets of program instructions 908 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 908 may be configured to operate via proportional control, feedback control, feedforward control, integral control, proportional-derivative (PD) control, proportional-integral (PI) control, proportional-integral-derivative (PID) control, or the like.

The one or more communication interfaces 910 may be operatively configured to communicate with components of the one or more controllers 902. For example, the one or more communication interfaces 910 may be configured to retrieve data from the one or more processors 904 or other devices, transmit data for storage in the memory 906, retrieve data from storage in the memory 906, and so forth. The one or more communication interfaces 910 may also be communicatively coupled with the one or more processors 904 to facilitate data transfer between components of the one or more controllers 902 and the one or more processors 904. It should be noted that while the one or more communication interfaces 910 is described as a component of the one or more controllers 902, one or more components of the one or more communication interfaces 910 may be implemented as external components communicatively coupled to the one or more controllers 902 via a wired and/or wireless connection. The one or more controllers 902 may also include and/or connect to one or more input/output (I/O) devices. In embodiments, the one or more communication interfaces 910 includes or is coupled to a transmitter, receiver, transceiver, physical connection interface, or any combination thereof.

The one or more communication interfaces 910 may be operatively configured to communicate with the one or more user interfaces 912. The one or more controllers 902 and the one or more user interfaces 912 may be separate components (e.g., have separate housings and/or separate chassis). It is noted herein, however, that the one or more controllers 902 and the one or more user interfaces 912 may be components integrated in a single housing and/or on a single chassis.

The one or more display devices 914 may include any display device known in the art. For example, the one or more display devices 914 may include, but are not limited to, a liquid crystal display (LCD), a light-emitting diode (LED) display, an organic light-emitting diode (OLED) based display, or the like. Those skilled in the art should recognize that a variety of display devices may be suitable for implementation in the disclosure and the particular choice of display device may depend on a variety of factors, including, but not limited to, form factor, cost, and the like. In a general sense, any display device 914 capable of integration with the one or more data input devices 916 (e.g., touchscreen, bezel mounted interface, keyboard, mouse, trackpad, and the like) is suitable for implementation in the disclosure.

The one or more data input devices 916 may include any data input device known in the art. For example, the one or more data input devices 916 may include, but are not limited to, a keyboard, a keypad, a touchscreen, a lever, a knob, a scroll wheel, a track ball, a switch, a dial, a sliding bar, a scroll bar, a slide, a touch pad, a paddle, a steering wheel, a joystick, a button, a bezel input device or the like. In the case of a touchscreen interface, those skilled in the art should recognize that a large number of touchscreen interfaces may be suitable for implementation in the disclosure. For instance, a display device 914 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device 914 is suitable for implementation in the disclosure.

It is noted herein the brewing apparatus 500, the one or more controllers 902, and/or the one or more user interfaces 912 (and/or select components of the brewing apparatus 500, the one or more controllers 902, and/or the one or more user interfaces 912) may be configured in accordance with guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like. However, it is noted herein that the brewing apparatus 500 may not be required to meet any regulations or design definitions. Therefore, the above description should not be interpreted as a limitation on the disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A vent valve flow fuse, comprising:
    a valve cap including a valve cap cavity defined by one or more valve cap interior surfaces;
    a valve body including a valve body cavity defined by one or more valve body interior surfaces;
    a poppet configured to at least partially fit within the valve cap cavity and at least partially fit within the valve body cavity, the poppet including an inlet portion and an outlet portion, the inlet portion including an inlet cavity defined by one or more inlet interior surfaces, the inlet portion including one or more inlet holes being in fluid communication with the inlet cavity, the outlet portion including an outlet cavity defined by one or more outlet interior surfaces, the outlet portion including one or more outlet holes being in fluid communication with the outlet cavity;
    a seal coupled to one or more exterior surfaces of the poppet; and
    a spring configured to fit within the valve body cavity, the spring further configured to generate a resistive force against the poppet,
    the poppet being in a first position when the top of the poppet abuts the valve cap and when fluid having a first amount of fluid pressure enters the valve cap cavity from a vent valve in fluid communication with a fluid tank of an aircraft brewing apparatus and engages the poppet, wherein the inlet portion of the poppet is positioned within the valve cap cavity, the outlet portion of the poppet is positioned within the valve body cavity and the valve cap cavity, and the seal is positioned within the valve body cavity when the poppet is in the first position, wherein the fluid having the first amount of fluid pressure enters the inlet cavity from the vent valve, exits the inlet cavity via the one or more inlet into the valve cap cavity, enters the outlet cavity via the one or more outlet holes from the valve body cavity, and exits the outlet cavity of the poppet,
    the poppet being in a second position when fluid having a second amount of fluid pressure enters the valve cap cavity from the vent valve with the fluid tank of the aircraft brewing apparatus and engages the poppet.

2. The vent valve flow fuse of claim 1, being configured to allow the fluid having the first amount of fluid pressure to pass from the vent valve to a drain reservoir of the brewing apparatus when the poppet is in the first position.

3. The vent valve flow fuse of claim 1, being configured to restrict fluid flow to a level not exceeding a flow rate of a drain reservoir of the brewing apparatus when the poppet is in the second position.

4. The vent valve flow fuse of claim 3, wherein the inlet portion of the poppet is positioned within the valve body cavity, the outlet portion of the poppet is positioned within the valve body cavity, and the seal is in contact with the one or more valve body interior surfaces when the poppet is in the second position.

5. The vent valve flow fuse of claim 4, wherein the fluid having the second amount of fluid pressure enters the inlet cavity defined by one or more inlet interior surfaces of the poppet from the vent valve and exits the inlet cavity via the one or more inlet holes in the poppet into the valve cap cavity, wherein the fluid having the second fluid pressure is blocked from entering the one or more outlet holes by the seal engaging the one or more valve body interior surfaces.

6. The vent valve flow fuse of claim 1, wherein a diameter of the one or more inlet holes is less than a diameter of the one or more outlet holes.

7. The vent valve flow fuse of claim 1, wherein the first amount of fluid pressure is less than the second amount of fluid pressure.

8. The vent valve flow fuse of claim 1, wherein the first amount of fluid pressure is less than the resistive force generated by the spring, wherein the second amount of fluid pressure is greater than the resistive force generated by the spring.

9. The vent valve flow fuse of claim 1, the spring configured to at least partially fit within the outlet cavity defined by the one or more outlet interior surfaces of the outlet portion of the poppet.

10. The vent valve flow fuse of claim 1, the diameter of the valve cap cavity being greater than the diameter than the valve body cavity.

11. The vent valve flow fuse of claim 1, further comprising:
    a seal inserted between one or more exterior surfaces of the valve cap and the one or more valve body interior surfaces when the valve cap and the valve body are coupled together, wherein the seal is configured to prevent fluid leakage between the valve cap and the valve body.

12. The vent valve flow fuse of claim 1, wherein the aircraft brewing apparatus is installed within an aircraft galley of an aircraft.

13. An aircraft brewing apparatus, comprising:
- a vent valve in fluid communication with a fluid tank;
- a drain reservoir; and
- a vent valve flow fuse in fluid communication with the vent valve and the drain reservoir, the vent valve flow fuse comprising:
  - a valve cap including a valve cap cavity defined by one or more valve cap interior surfaces;
  - a valve body including a valve body cavity defined by one or more valve body interior surfaces;
  - a poppet configured to at least partially fit within the valve cap cavity and at least partially fit within the valve body cavity, the poppet including an inlet portion and an outlet portion, the inlet portion including an inlet cavity defined by one or more inlet interior surfaces, the inlet portion including one or more inlet holes being in fluid communication with the inlet cavity, the outlet portion including an outlet cavity defined by one or more outlet interior surfaces, the outlet portion including one or more outlet holes being in fluid communication with the outlet cavity;
  - a seal coupled to one or more exterior surfaces of the poppet; and
  - a spring configured to fit within the valve body cavity, the spring further configured to generate a resistive force against the poppet,
  - the poppet being in a first position when the top of the poppet abuts the valve cap and when fluid having a first amount of fluid pressure enters the valve cap cavity from the vent valve and engages the poppet, wherein the inlet portion of the poppet is positioned within the valve cap cavity, the outlet portion of the poppet is positioned within the valve body cavity and the valve cap cavity, and the seal is positioned within the valve body cavity when the poppet is in the first position, wherein the fluid having the first amount of fluid pressure enters the inlet cavity from the vent valve, exits the inlet cavity via the one or more inlet holes into the valve cap cavity, enters the outlet cavity via the one or more outlet holes from the valve body cavity, and exits the outlet cavity of the poppet to the drain reservoir,
  - the poppet being in a second position when fluid having a second amount of fluid pressure enters the valve cap cavity from the vent valve and engages the poppet.

* * * * *